[19] United States Patent
Rosen et al.

[11] Patent Number: 4,555,346
[45] Date of Patent: Nov. 26, 1985

[54] PROCESS FOR FLOCCULATING PHOPHATIC SLIMES

[75] Inventors: Meyer R. Rosen, Spring Valley, N.Y.; You-Ling Fan, East Brunswick, N.J.; Nan S. Chu, Hartsdale, N.Y.

[73] Assignee: Union Carbide Corporation, Danbury, Conn.

[21] Appl. No.: 651,338

[22] Filed: Sep. 17, 1984

Related U.S. Application Data

[63] Continuation of Ser. No. 302,141, Sep. 14, 1981, abandoned.

[51] Int. Cl.[4] ............................................. B01D 21/01
[52] U.S. Cl. ........................................ 210/734; 209/5; 210/907
[58] Field of Search .................... 209/5; 210/725, 727, 210/728, 733, 734, 907; 524/801

[56] References Cited

U.S. PATENT DOCUMENTS

| | | | |
|---|---|---|---|
| 2,980,609 | 4/1961 | House et al. | 210/734 |
| 3,284,393 | 11/1966 | Vanderhoff | 526/317 |
| 3,418,237 | 12/1968 | Booth et al. | 210/734 |
| 3,578,586 | 5/1977 | Gal et al. | 210/734 |
| 3,658,771 | 4/1972 | Volk et al. | 209/5 |
| 3,691,124 | 9/1972 | Barron | 524/801 |
| 3,850,898 | 11/1974 | Ide et al. | 210/734 |
| 3,872,063 | 3/1975 | Kim | 526/240 |
| 3,926,756 | 12/1975 | Restaino | 526/240 |
| 3,996,180 | 12/1976 | Kane | 260/29.6 H |
| 3,997,492 | 12/1976 | Kane | 524/801 |
| 4,035,334 | 7/1977 | Korzenski et al. | 526/240 |
| 4,237,253 | 12/1980 | Jacquet et al. | 526/240 |
| 4,288,582 | 9/1981 | Lucas et al. | 526/240 |
| 4,309,329 | 1/1982 | Lucas et al. | 526/240 |
| 4,330,450 | 5/1982 | Lipowski et al. | 210/734 |

FOREIGN PATENT DOCUMENTS 2543135 10/1976 Fed. Rep. of Germany ...... 210/727
51-18913 6/1976 Japan .

OTHER PUBLICATIONS

ACS Articles "Fractionation of Linear Polyethylene with Gel Permeation Chromatography," 1973, pp. 99–107.

Primary Examiner—Peter Hruskoci
Attorney, Agent, or Firm—Henry H. Gibson

[57] ABSTRACT

Described herein is a process for flocculating phosphatic slimes which comprises (a) forming a concentrated aqueous solution from a water-soluble ter-or higher polymer water-in oil emulsion, (b) diluting said concentrated aqueous solution of ter-or higher polymer formed in step (a) with additional water, (c) mixing the diluted solution of (b) with phosphatic slimes under appropriate floc forming conditions and (d) allowing the suspended solids to settle from said slime to form an essentially clear aqueous supernatant.

10 Claims, No Drawings

PROCESS FOR FLOCCULATING PHOSPHATIC SLIMES

This application is a continuation of prior U.S. application: Ser. No. 302,141 Filing Date Sept. 14, 1981 now abandoned.

This invention is directed to a process for flocculating phosphatic slimes. The process comprises adding an aqueous solution of a water soluble ter-or higher polymer to a phosphatic slime under floc forming conditions and thereafter allowing the suspended solids to settle from the suspension to provide an essentially clear aqueous supernatant.

Water soluble homo- and copolymers of acrylamide have been widely used in thickening or dewatering solids from sewage. Copolymers of acrylamide are useful in flocculating phosphatic slimes. However, there is a need for materials with improved flocculation efficiency.

It has now been found that when a ter-or higher polymer is prepared from monomers wherein one of the monomers is water-insoluble or very slightly water soluble, the resulting ter-or higher polymer has increased flocculation efficiency when used as a flocculant for phosphatic slimes. These ter-or higher polymers are particularly effective for flocculating phosphatic slimes containing widely differing amounts of individual clay components.

THE INVENTION

This invention is directed to a process for flocculating phosphatic slimes which comprises (a) forming a concentrated aqueous solution from a water soluble ter-or higher polymer water-in-oil emulsion, (b) diluting said concentrated aqueous solution of ter-or higher polymer formed in step (a) with additional water, (c) mixing the diluted solution of (b) with phosphatic containing slimes under appropriate floc forming conditions and (d) allowing the suspended solids to settle from said slime to form an essentially clear aqueous supernatant.

The concentrated aqueous solution formed from the water-soluble ter-or higher polymer water-in-oil emulsion contains from about 0.15 to about 9.0 weight percent, preferably from about 0.30 to about 6.0 weight percent; said weight percent based on the total weight of the emulsion.

The concentrated aqueous solution is then further diluted with water. The diluted solution then contains from about 0.0003 to about 0.3 weight percent, preferably from about 0.0006 to about 0.015 weight percent, said weight percent based on the total weight of the emulsion.

The diluted solution is mixed in whole or in part with the phosphatic slime. The solution may be mixed with the phosphatic slime at one or more addition points. The flow rate of diluted flocculant solution is adjusted to achieve an effective flocculant dosage which is measured in pounds of emulsion per ton of dry slime solids.

The floc forming conditions include appropriate choice of flocculant dosage, concentration of dilute flocculant solution, selection of acceptable mixing energy to achieve desirably large size flocs and appropriate contact between flocculant solution and slime.

Upon addition of the diluted flocculant solution under the floc forming conditions, rapid separation of suspended solids begins to occur. With time the concentration of suspended solids increases significantly and an essentially clear supernatant results.

The ter-or higher polymers are prepared by water-in-oil polymerization processes which are well known in the art. Preferably the ter-or higher polymers are produced by the process as described in U.S. patent application Ser. No. 302,108, now U.S. Pat. No. 4,485,209 (Fan et al.) filed in the name of Y. Fan et al titled "A Process For Producing a Polymer Water-In-Oil Emulsion" and filed on Sept. 14, 1981. In said U.S. Pat. No. 4,485,209 (Fan et al.) a semi-continuous process for producing a polymer water-in-oil emulsion is described which process comprises:

(a) combining: (i) an aqueous solution comprising at least one water-soluble monomer, and (ii) a mixture comprising a hydrophobic liquid, a hydrophobic monomer and an oil-soluble surfactant:

(b) homogenizing the mixture from (a) to form a water-in-oil emulsion;

(c) deoxygenating said homogenized water-in-oil emulsion;

(d) continually adding the homogenized water-in-oil emulsion to a reactor while adding thereto a deoxygenated initiator solution;

(e) heating the mixture from (d) under polymerization conditions so as to form a polymer water-in-oil emulsion; and (f) recovering a polymer water-in-oil emulsion.

A water-soluble surfactant is generally added to the recovered water-in-oil emulsion (f). These water-in-oil emulsions are mixed with water to form an oil-in-water emulsion which liberates the polymer formerly occupying the internal phase of the water-in oil emulsion.

In the first step of the process, an aqueous solution containing at least one water-soluble monomer is combined with a mixture containing a hydrophobic liquid, a hydrophobic monomer and an oil-soluble surfactant. This combination of materials is homogenized to form a water-in-oil emulsion.

The aqueous solution contains a mixture of water soluble monomers. These monomers have a water solubility of at least 5 weight percent and include acrylamide, methacrylamide, acrylic acid, methacrylic acid, vinyl sulfonic acid, 2-acrylamido-2-methylpropanesulfonic acid and their alkali metal salts, aminoalkyl acrylate, aminoalkyl methacrylate, dialkylaminoalkyl acrylate, dialkylamino methacrylate and their quarternized salts with dimethyl sulfate or methyl chloride, vinyl benzyl dimethyl ammonium chloride, alkali metal and ammonium salts of 2-sulfoethylacrylate, alkali metal and ammonium salts of vinyl benzyl sulfonates, maleic anhydride, acrolein, N-vinyl pyrolidane, and the like. The preferred monomers are acrylamide and acrylic acid.

If acrylic acid is used as a monomer it is reacted with a base, preferably with an equivalent amount of base, such as sodium hydroxide, so that the sodium acrylate solution has a pH of from about 5.0 to about 10.0, preferably from about 6.5 to about 8.5, depending on the type and amount of base employed. This solution is combined with another water soluble monomer, such as acrylamide, and then with water to form the aqueous phase.

The aqueous phase comprises from about 65 to about 80, preferably from about 70 to about 78 weight percent of the total composition.

The mixture which is combined with the aqueous solution containing the water-soluble monomers contains a hydrophobic liquid, a hydrophobic monomer and an oil-soluble surfactant.

The hydrophobic liquids suitable for use herein include dodecanes, hexadecanes, benzene, xylene, toluene, mineral oils, kerosenes, petroleum, and mixtures thereof. A preferred hydrophobic liquid is Isopar M (sold by Humble Oil and Refinery Company).

The hydrophobic monomer(s) which may be used in this invention have a water solubility of less than 5 weight percent and include one or more of vinyl esters, such as vinyl acetate, alkyl acrylates, such as ethylacrylate, alkyl methacrylates such as methyl methacrylate, vinyl ethers such as butylvinyl ether, acrylonitrile, styrene and its derivatives, such as α-methylstyrene, N-vinyl carbazole, and the like.

The surfactants suitable for use herein are usually of the oil-soluble type having a Hydrophile-Lipophile Balance (HLB) value of from about 1 to about 10, preferably from about 2 to about 6. These surfactants are normally referred to as the water-in-oil type. The surfactants include fatty acid esters, such as sorbitan monolaurate, sorbitan monstearate, sorbitan monooleate, sorbitan trioleate, mono and diglycerides, such as mono and diglycerides obtained from the glycerolysis of edible fats, polyoxyethylenated fatty acid esters, such as polyoxyethylenated (4) sorbitan monostearate, polyoxyethylenated linear alcohol, such as Tergitol 15-S-3 and Tergitol 25-L-3 (both supplied by Union Carbide Corp.), polyoxyethylene sorbitol esters, such as polyoxyethylene sorbitol beeswax derivative, polyoxyethylenated alcohols such as polyoxyethylenated (2) cetyl ether, and the like.

The mixture of the aqueous phase and oil phase contains from about 15 to about 50, preferably from about 29 to about 40 weight percent of the hydrophobic liquid and hydrophobic monomer(s), based on the total weight of the composition.

The aqueous solution (i) containing the water-soluble monomers is combined with the mixture containing a hydrophobic liquid, a hydrophobic monomer(s) and an oil-soluble surfactant. This mixture is homogenized to form a water-in-oil emulsion. Homogenization takes place by subjecting the mixture to high shear mixing techniques which are generally well-known in the art. These include the use of homogenizers, high speed mixers and any other techniques for obtaining high shear mixing. The homogenization is carried out at a temperature of from about 10° to about 40° C., preferably from about 15° to 25° C. The homogenization may be carried out either continuously or in a batch process.

The emulsions so prepared have a rather narrow particle size distribution. The diameters of the majority of the particles range from about 0.2 to about 5.0 microns, preferably from about 1 to 3 microns.

The water-in-oil emulsion so produced comprises:
(a) An aqueous phase comprising from about 45 to about 80, preferably from about 48 to about 78 weight percent and containing water-soluble monomer(s) wherein the monomers constitute from about 20 to about 60, preferably from about 30 to about 50 weight percent;
(b) a hydrophobic liquid and hydrophobic monomer(s) comprising from about 15 to about 50, preferably from about 20 to about 40 weight percent;
(c) an oil-soluble surfactant comprising from about 0.1 to about 5, preferably from about 1 to about 3 weight percent.

After forming the water-in-oil emulsion, it is generally deoxygenated, by for example, subjecting the emulsion to a vacuum of from about 50 to about 500, preferably from about 100 to about 200 mm of mercury under an inert gas atmosphere at a temperature of from about 10° to about 40° C., either continuously or as a batch process.

A reactor is continuously charged with the deoxygenated water-in-oil emulsion. Preferably, an initial charge of between about 20 to about 50 percent of the deoxygenated emulsion is added to the reactor. Most preferably, the reactor is charged with an amount of deoxygenated water in-oil emulsion so as to cover the agitator blades therein. The amount charged to the reactor depends on the geometry and size of the reactor.

Also, a catalyst or initiator useful in polymerizing ethylenically unsaturated monomers is added to the reactor. These catalysts include one or more azo and/or peroxide containing compounds, such as t-butyl hydroperoxide, t-butyl perbenzoate, benzoyl peroxide, ammonium persulfate, cumene hydroperoxide, 2,2'-azobis-(isobutyronitrile), 2,2'-azobis(2,4-dimethylvaleronitrile), redox catalysts, and others known in the art. These catalysts are added to the reactor either directly or in the form of a solution, i.e., the catalyst is dissolved in a solvent, such as a hydrocarbon liquid, i.e., toluene. The catalyst solution contains from about 1 to about 10, preferably from about 3 to about 6 weight percent of the catalyst.

From about 1 to about 99, preferably from about 20 to about 60 percent of the catalyst solution is initially added to the reactor containing the water-in-oil emulsion.

The remaining water-in-oil emulsion and catalyst solution are then continually fed into the reactor.

The polymerization is carried out at a temperature of from about 30° to about 70° C., preferably from about 40° to about 55° C., most preferably from about 48° to about 52° C., from about 1 to about 10 hours, preferably from about 2 to about 6 hours. The reaction time depending on the size of the reactor and the polymerization conditions.

The polymerization is generally carried out at atmospheric pressure, although subatmospheric and superatmospheric pressures may be used. The polymerization is preferably carried out under an inert atmosphere, such as a helium, argon or nitrogen.

The polymerization reaction generates considerable heat which must be removed. Generally, the heat is dissipated by normal cooling facilities.

The polymerization reaction rate may be controlled by the introduction of small quantities of air (atmospheric air and/or oxygen) into the reaction. The air may be introduced, i.e., sparged, either intermittently or continuously into the reactor to control the reaction temperature. When a continuous air sparging is employed, the amount of oxygen in the reaction medium must be carefully controlled so as to achieve the desired rate of polymerization. An oxygen content of from about 0.01 to about 1.0, preferably from about 0.02 to about 0.50 parts per million is desirable. When the air is introduced intermittently, a flow rate of from about 0.01 to about 1.0, preferably from about 0.05 to about 0.5 cubic inches per minute, per pound of reactor charge is desirable. The duration of air injection may vary from a fraction of a second to a few seconds, and it may be repeated as many times as necessary until a desired rate of polymerization is achieved.

After the polymerization is complete, an antioxidant may added to the reaction mass. Any organic antioxidant suitable for the inhibition of free radical reactions may be used. The antioxidant is generally dissolved in a suitable solvent. The preferred antioxidants include substituted phenols, such as Ionol, thiobisphenol, such as Santonox-R, and hydroquinone derivatives, such as the monomethyl ether of hydroquinone. The suitable solvents include toluene, benzene, xylene, diethyl ether, methyl acetate, and the like. The antioxidant is present in the solution in amounts of from about 1 to about 30, preferably from about 5 to about 10 percent.

The antioxidant solution is added to the reaction mass in amounts of from about 0.05 to about 5 parts per hundred parts of resin.

Addition of the antioxidant may be commenced either at the end of the polymerization or after the reaction mixture has been cooled to ambient temperature.

The reaction mass is generally cooled to about 25° C. and the polymer water-in-oil emulsion recovered.

The polymer water-in-oil emulsion is described in U.S. Pat. No. 4,452,940 (Chu et al.).

The polymer water-in-oil emulsion as described in said U.S. Pat. No. 4,452,940 (Chu et al.) comprises:
(a) an aqueous phase constituting from about 60 to about 80, preferably from about 68 to about 78 weight percent, and containing therein from about 30 to about 70, preferably from about 35 to about 55 weight percent of polymer and from about 30 to about 70, preferably from about 45 to about 65 weight percent of water;
(b) a hydrophobic liquid constituting from about 15 to about 50, preferably from about 19 to about 31 weight percent, and
(c) an oil-soluble surfactant constituting from about 0.5 to about 5, preferably from about 1 to about 3 weight percent, said weight percents (based on the total weight of the emulsion).

The polymers produced have an intrinsic viscosity of from about 2 to about 40, preferably from about 10 to about 35, and most preferably from about 18 to about 30 dl/g as measured in a one normal aqueous sodium chloride solution at 25° C.

The preferred terpolymers are acrylamide containing terpolymers having an intrinsic viscosity of at least about 15 dl/g. There are described in U.S. patent application Ser. No. 302,110, now U.S. Pat. No. 4,529,782 (Fan et al.) filed in the names of Y. Fan et al, tilted "High Molecular Weight Water Soluble Polymers" and filed on Sept. 14, 1981.

The acrylamide containing polymers in said U.S. Pat. No. 4,529,782 (Fan et al.) are of the following formula:

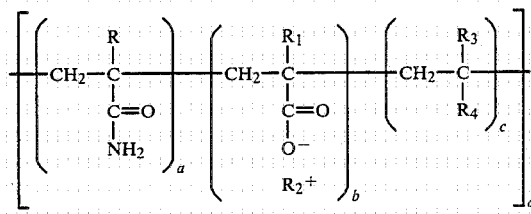

wherein R, $R_1$ and $R_3$ are independently hydrogen or methyl, $R_2^+$ is an alkali metal ion, such as $Na^+$ or $K^+$, $R_4$ is $OR_5$, where $R_5$ is an alkyl group having up to 5 carbon atoms,

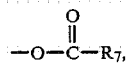

wherein $R_7$ is either methyl, ethyl or butyl

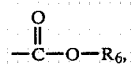

phenyl, substituted phenyl, CN, or

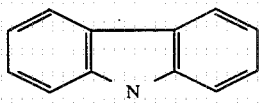

and $R_6$ is an alkyl group having up to 8 carbon atoms, wherein (a) is from 5 to about 90, preferably from about 30 to about 60 percent, (b) is from 5 to about 90, preferably from about 30 to about 60 percent, (c) is from about 0.2 to about 20, preferably from about 1 to about 10 percent, and (d) is an integer of from about 1,000 to about 1,000,000.

Under certain conditions, the alkoxy or acyloxy groups in the polymer may be partially hydrolyzed to the corresponding alcohol group and yield a tetrapolymer of the following general formula:

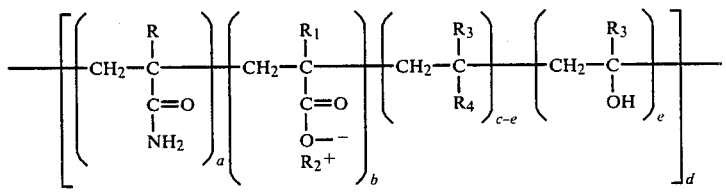

wherein R, $R_1$, $R_2^+$, $R_3$, $R_4$, a, b, c, and d are as previously defined and e is from about 0.1 to about 20 percent;

The preferred polymers are terpolymers of the following formula:

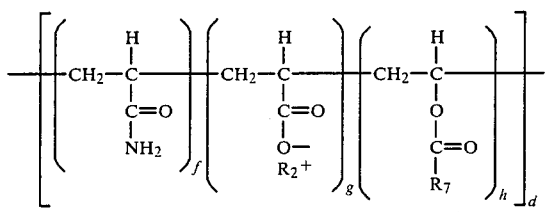

wherein $R_2^+$ is $Na^+$ or $K^+$, $R_7$ is methyl, ethyl, or butyl, and f is from about 5 to about 90, preferably from about 30 to about 60 percent, g is from about 5 to 90, preferably from about 30 to 60 percent h is from about 0.2 to about 20 percent, and d is as previously defined.

The preferred tetrapolymers are of the following formula:

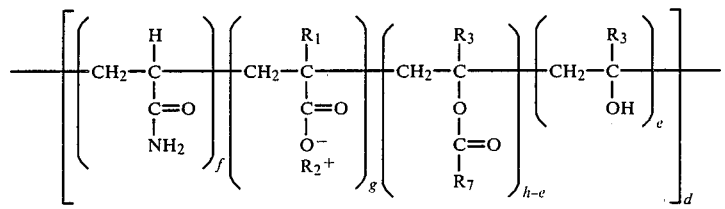

wherein $R_1$, $R_2^+$, $R_3$, $R_7$, f, g, h, d and e are as previous defined.

After the water-in-oil emulsion is prepared, a water-soluble inverting surfactant may be added thereto. The surfactants which may be used include polyoxyethylene alkyl phenol, polyoxyethylene (10 mole) cetyl ether, polyoxyethylene alkyl-aryl ether, quaternary ammonium derivatives, potassium oleate, N-cetyl N-ethyl morpholinium ethosulfate, sodium lauryl sulfate, condensation products of higher fatty alcohols with ethylene oxide, such as the reaction product of oleyl alcohol with 10 ethylene oxide units; condensation products of alkylphenols and ethylene oxide, such as the reaction products of isooctylphenol with 12 ethylene oxide units; condensation products of higher fatty acid amines with five, or more, ethylene oxide units; ethylene oxide condensation products of polyhydric alcohol partial higher fatty esters, and their inner anhydrides (mannitolanhydride, called Mannitan, and sorbitol-anhydride, called Sorbitan). The preferred surfactants are ethoxylated nonyl phenols, ethoxylated nonyl phenol formaldehyde resins, and the like.

The inverting surfactant is used in amounts of from about 0.1 to about 20, preferably from about 1 to about 10 parts per one hundred parts of the polymer.

The water-in-oil emulsion containing the inverting surfactant is then inverted in the presence of water as described above.

EXAMPLES

The following examples serve to give specific illustrations of the practice of this invention but they are not intended in any way to limit the scope of this invention.

EXAMPLE 1

Preparation of monomer emulsion feed:
(i) Sodium acrylate solution: An acrylic acid solution containing 158.2 gm of acrylic acid and 186.94 gm of deionized water was neutralized with a freshly prepared 40 percent sodium hydroxide solution (about 229.09 gm) to a final pH of 6.5. The neutralization was carried out at a temperature not exceeding 20° C. to prevent premature polymerization from taking place.
(ii) Acrylamide solution: The solution was prepared by adding 205.69 gm of acrylamide crystals under vigorous stirring to 251.95 gm of deionized water at a temperature below 25° C. Air was present during the dissolution to inhibit polymerization.
(iii) Oil-soluble monomer and surfactant mixture: A homogenous solution was prepared by dissolving 18.92 gm of a sorbitan monooleate (Span-80 supplied by Imperial Chemical Industries) into 339.5 gm of Isopar-M while stirring. Thereafter, 21.27 gm of vinyl acetate was rapidly added and the system stirred for an additional five minutes to yield a uniform mixture.
(iv) Monomer emulsion feed: Into a Waring blender, containing mixture (iii), was added, under vigorous stirring, solutions (i) and (ii). The latter was combined with 0.06 gm of ethylenediamine tetraacetic acid prior to its addition to ensure compositional uniformity of the finished monomer emulsion.

The monomer emulsion as prepared above was thoroughly deoxygenated by stirring under a vacuum for 10 minutes and subsequently breaking the vaccum with nitrogen; this procedure was repeated two more times. Thereafter, the monomer emulsion was kept at 25° C. or below under a nitrogen atmosphere until its complete addition. The storage tank was equipped with a cooling coil (jacket), a temperature measuring device, and an air-injection dip tube which can be used to stop the polymerization in case of an accidental initiation.

Initiator solution feed: This solution was prepared by dissolving 0.78 gm of 2,2'-azobis(isobutyronitrile) (Vazo-64 supplied by E. I. duPont de Nemours & Co.) dissolved in 17.78 gm of toluene. The solution was purged with nitrogen before and during the course of polymerization.

Inhibitor solution: The solution was prepared by dissolving 0.78 gm of a thiobisphenol (Santonox-R supplied by Monsanto Chemical Co.) in 10 gm of toluene.

The reactor consisted of a two-liter Pyrex glass reactor equipped with a turbine agitator, two addition funnels, a condenser, a thermometer, and a nitrogen inlet and outlet tube. As external heating/cooling bath was employed. The turbine agitator had a four-one-inch blade impeller and the blades were pitched at a 45° angle to the driving shaft.

The reactor was charged, under a nitrogen atmosphere, with 282.32 gm (20 percent) of the monomer emulsion. While the nitrogen flow continued, heating was applied to bring the reaction temperature to 55° C. Once the temperature was stabilized, 3.91 gm of the initiator solution was quickly added. Thereafter, both the monomer emulsion and the catalyst solution streams were continuously fed into the reactor at rates such that feeding was complete in about two hours. The induction time was usually very short and an exotherm may occur immediately after the initiator addition. After charging was complete, the polymerization was allowed to continue for two additional hours. During this period, sufficient cooling was provided to dissipate the heat of polymerization. The reactor temperature was maintained at 55°±2° C. At the end of polymerization, the inhibitor solution was added and the reactor was allowed to cool to room temperature (about 25° C.). The product was discharged through a two-layer cheese cloth. The conversion was usually quantitative and the finished emulsion contained about 30 percent by weight of polymer. The polymer had an intrinsic viscosity of 18.4 dl/gm. as measured in a one normal aqueous sodium chloride solution. The emulsion was highly uniform and contained very fine particles which had diameters ranging from about 0.2 to about 5 microns.

EXAMPLE 2

Preparation of monomer emulsion feed:

(i) Sodium acrylate solution: An acrylic acid solution containing 124.84 gm acrylic acid and 227.86 gm of deionized water was neutralized with a freshly prepared 40 percent sodium hydroxide solution (about 173.39 gm) to a final pH of 6.5. The neutralization was carried out at temperatures not exceeding 20° C. to prevent premature polymerization from taking place.

(ii) Acrylamide solution: This solution was prepared by adding 205.93 gm of acrylamide crystals to 261.6 gm of water under vigorous stirring at temperatures below 25° C. Air was present during the dissolution to inhibit polymerization.

(iii) Oil-soluble monomer and surfactant mixture: A homogenous solution was prepared by dissolving 19.12 gm of Span-80 into 339.43 gm of Isopar-M under agitation. Thereafter, 66.6 gm of ethyl acrylate was rapidly added and the system stirred for an additional five minutes to yield a uniform mixture.

The monomer emulsion feed was prepared and deoxygenated, the initiator solution feed and inhibitor solution were prepared and the monomers polymerized all by the procedure as described in Example 1.

The product was a milky white water-in-oil emulsion. Examination by an optical microscope showed that the average diameter of the suspended particles was about 1 to 2 microns. The polymer had an intrinsic viscosity of 16.4 dl/gm as measured in a one normal aqueous sodium chloride solution.

EXAMPLE 3

A portion of the product prepared in Example 1 was thoroughly mixed with a water soluble surfactant, i.e., a polyoxyethylenated nonylphenol (Tergitol NP-10 supplied by Union Carbide Corporation) to yield an emulsion containing about 5.0 parts per one hundred parts of polymer. The polymer portion of the emulsion can be rapidly dissolved in water with stirring. An aqueous solution containing 0.3 percent of this polymer had a typical Brookfield viscosity to about 2,400 centipoise (Brookfield Viscometer Model HBT, Spindle No. 2, 10 RPM and at 25° C.).

EXAMPLE 4

A portion of the product made in Example 2 was mixed with a water soluble surfactant, i.e., a polyoxyethylenated nonylphenol (Tergitol NP 13 supplied by Union Carbide Corp.) to yield an emulsion containing about 5.0 parts of surfactant per one hundred parts of polymer. An aqueous solution containing 1 percent by weight of this emulsion had a Brookfield viscosity of about 2,200 centipoise (as measured by the procedure in Example 3).

EXAMPLE 5

Into a 500 ml, 4-necked, resin flask, fitted with a condenser, a thermometer, a mechanical stirrer, an additional funnel and a nitrogen inlet tube, were added 75 g of Isopar M and 4.4 g of Span 80 under nitrogen gas. in a separate beaker, 28.2 g of acrylic acid dissolved in 50 g of distilled water was neutralized (pH 6.7) with 39.2 g of a 40 percent sodium chloride solution. The sodium acrylate solution was combined with an aqueous solution made with 47.1 g of acrylamide and 79 g of distilled water. The aqueous solution was purged with nitrogen and then added to the Isopar M-Span 80 mixture with rapid stirring to produce an emulsion. The emulsion was stirred under a nitrogen atmosphere for about ½ hour. 15.1 g of ethyl acrylate and 0.20 g of 2,2′azobis(isobutyronitrile) were added. The reaction mixture was heated to 40° C. and 0.02 g of sodium bisulfite in 10 ml distilled water was added. The temperature of the emulsion was gradually increased to 43° C. At the same time, a solution made with 15 g of Isopar M and 4.4 g of Span 80 was slowly added to the reaction mixture. The polymerization was carried out at a temperature of 43°–45° C. for 4 hours and then at 55° C. for 1 hour. A smooth emulsion was obtained at the end of the reaction. A gas chromatographic study of the emulsion indicated that only four percent of the amount of ethyl acrylate used was left unreacted.

A portion of the polymer in the emulsion was precipitated by adding the emulsion to isopropanol. The polymer was isolated by filtering. The polymer had an intrinsic viscosity of 16.1 dl/g as measured in a one normal aqueous sodium chloride solution.

A clear aqueous solution was obtained when the isolated polymer was dissolved in water indicating that no homopolymer of ethyl acrylate was formed.

EXAMPLES 6 TO 9

The procedures described in Examples 5 and 6 were used to prepare the polymer emulsions of Examples 6 and 9. The emulsions obtained were used as flocculants in phosphate slimes.

Aqueous solutions of the polymer emulsions containing 0.3 g of the polymer were made by dissolving the desired amount of the water-in-oil polymer emulsion in distilled water containing about 0.14 g of a polyoxyethylenated nonylphenol an inverting surfactant (Tergitol NP-13) and diluted to 100 g. The stock solutions were used as flocculants in phosphate slimes. The performance of the polymer emulsion as a flocculants in phosphate slimes (Slime 1 and Slime 2 were two phosphate slimes obtained from a phosphate mining company) was measured by the time in seconds for the falling interface to travel 30 percent of the height of the sedimentation tube (designated $t_{70}$). The results are shown in Table I. Control A contains no polymer.

TABLE I

| Example | Method as Described in Example | Mole Ratio | | | Performance, $t_{70}$ (sec) | |
|---|---|---|---|---|---|---|
| | | Sodium Acrylate | Acrylamide | Ethyl Acrylate | Phosphate Slime 1 | Phosphate Slime 2 |
| 6 | 5 | 32.5 | 55.0 | 12.5 | 8.4 | |
| 7 | 5 | 25.0 | 62.5 | 12.5 | 9.7 | |
| 8 | 6 | 25.0 | 70.0 | 5.0 | | 7.9 |
| 9 | 6 | 10.0 | 85.0 | 5.0 | | 8.1 |
| Control A | — | — | — | — | several hours | |

EXAMPLE 10

Example 1 was exactly repeated except that the following changes were made: (1) Vazo-64 was replaced with one-half the amount of Vazo-52 (2,2'-azobis (2,4-dimethyl-valeronitrile) supplied by E. I. duPont de Nemours & Co.) and the polymerization was carried out at 52° C.; (2) the pH of the sodium acrylate solution was adjusted to 8.6 instead of 6.5. The resultant terpolymer had an intrinsic visiosity of 29.7 dl/g as measured in a one normal aqueous sodium chloride solution. A 0.3 percent solution prepared and measured according to Example 3 exhibited a Brookfield viscosity of 2,720 centipoise.

EXAMPLE 11

Example 10 was exactly repeated except that the following changes were made: (1) the pH of the sodium acrylate solution was adjusted to 9.4 instead of 8.6; (2) a commercial rayon-cell 50 percent caustic solution was used to neutralize the acrylic acid. The resultant terpolymer had an intrinsic viscosity of 21 dl/g as measured in a one normal aqueous sodium chloride solution. A 0.3 percent solution prepared according to Example 3 exhibited a Brookfield viscosity of 2,650 centipoise.

EXAMPLE 12

Example 10 was exactly repeated except that the following changes were made: (1) A 50 percent aqueous acrylamide solution (Cyanamid-50 supplied by American Cyanamid Co.) was substituted for the acrylamide crystals; an equal amount of water was reduced from the original formulation such that the oil/water phase ratio remained unchanged; (2) acrylic acid was neutralized to a pH of 6.5 instead of 8.6. The resultant terpolymer had an intrinsic viscosity of 21.7 dl/g as measured in a one normal aqueous sodium chloride solution. A 0.3 percent solution prepared according to Example 3 exhibited a Brookfield viscosity of 2,848 centipoise.

EXAMPLE 13

Flocculation tests of the terpolymers prepared in Examples 10–12 were carried out according to the procedures described in Examples 6–9. The $t_{70}$ values of all three samples were found to be below 8 seconds as compared to several hours with that of the control. By comparison, the supernatant of the control suspended particles even after several hours of standing.

EXAMPLE 14

A three foot diameter Enviroclear thickener was used into which phosphatic slimes and sand were mixed. The sand to clay ratio was 1.56. A flocculant concentrate in water (0.25 weight percent) was formed from a terpolymer emulsion containing 55 mole percent of acrylamide, 32.5 mole percent of sodium acrylate, and 12.5 mole percent of ethyl acrylate. The flocculant concentrate was pumped at a rate of 0.92 gallons per minute and mixed with dilution water flowing at a rate of 3 gallons per minute. The diluted flocculant solution (0.0075 weight percent based on weight of the emulsion) was mixed with sand and phosphatic slime (3.69 percent solids). The flow rate of phosphatic slime was 9.52 gallons per minute.

The flocculant dosage was 1.32 pounds of emulsion per ton of dry slime solids. This procedure resulted in an increase of percent slime solids from 3.69 to 19.9.

Control B

The procedure of Example 14 was exactly repeated except that a flocculant concentrate in water (0.25 weight percent) was formed from a copolymer emulsion containing 75 mole percent of acrylamide and 25 mole percent sodium acrylate. The flocculant concentrate was pumped at a rate of 0.1 gallons per minute and mixed with dilution water flowing at a rate of 3 gallons per minute. The diluted flocculant solution (0.008 weight percent based on the weight of the emulsion) was mixed with sand and phosphatic slimes (3.50 percent solids). The flow rate of phosphatic slime was 8.6 gallons per minute.

The flocculant dosage was 1.75 pounds of emulsion per ton of dry slime solids. This procedure resulted in an increase of percent solids from 3.50 to 15.1.

It can be seen that the terpolymers of the present invention (Example 14) are more effective flocculants than the copolymers of Control B.

EXAMPLE 15

Example 1 was repeated with the exception that (1) Vazo-64 was replaced with one-half the amount of Vazo-52; (2) the polymerization was carried out at 52° C. according to the following procedures:

Polymerization reactor (lab batch): a two-liter Pyrex glass reactor equipped with a turbine agitator, an addition funnel, a condenser, a thermometer, a nitrogen inlet and outlet, and an external heating/cooling bath was employed. The turbine agitator had a four-one-inch-blade impeller and the blades were pitched at a 45° C. angle to the driving shaft, and was operating at 650 revolutions per minute during the course of polymerization.

The monomer emulsion was transferred into the glass reactor and was degassed by stirring it under vacuum for 10 minutes and subsequently breaking the vacuum with nitrogen; this procedure was repeated two more times.

About 20 percent of the Vazo-52/toluene solution was introduced into the degassed monomer emulsion in the reactor. While the nitrogen flow continued, external heating was applied to bring the reaction temperature to 52° C. Once the polymerization began, the remaining initiator solution was added continuously into the reactor at a rate such that the addition was completed in two hours. When the initiator solution addition was finished, the polymerization was allowed to proceed for two additional hours. During the entire course of polymerization, sufficient cooling was provided in order to dissipate the heat of polymerization. At the end of the polymerization, the emulsion was cooled to room temperature (about 25° C.), and the inhibitor solution was added. The water-in-oil emulsion produced was a fairly viscous, milky white liquid. The conversion was quantitative. The polymer produced had an intrinsic viscosity of 32 dl/g as measured in a one normal aqueous sodium chloride solution.

EXAMPLE 16

The procedure of Example 1 was used to prepare an emulsion containing an acrylamide/sodium acrylate/vinyl acetate terpolymer. The terpolymer contained 54.2 mole percent of acrylamide, 41.1 mole percent sodium acrylate and 4.7 mole percent of vinyl acetate. The terpolymer had an intrinsic viscosity of 13 dl/g as measured in a one normal aqueous sodium chloride solution.

An aqueous solution of the polymer emulsion containing 0.3 g of the polymer was made by dissolving the desired amount of the water-in-oil polymer emulsion in distilled water containing about 0.14 g of polyethylenated nonylphenol surfactant (Tergitol NP-13) and diluted to 100 g. The solution was used as a flocculant in phosphate slimes. The performance of the polymer emulsion as a flocculant in a phosphate slime (a phosphate slime obtained from a phosphate mining company) was measured by the time in seconds for the falling interface to travel 30 percent of the height of the sedimentation tube (designated '70). The results are shown in Table II.

EXAMPLE 17

The procedure of Example 16 was repeated to prepare a terpolymer having an intrinsic viscosity of 15 dl/g as measured in a one normal aqueous sodium chloride solution. An aqueous solution of the polymer emulsion was prepared and tested as described in Example 16.

The results are shown in Table II.

EXAMPLE 18

The procedure of Example 16 was repeated to prepare a terpolymer having an intrinsic viscosity of 17 dl/g as measured in a one normal aqueous sodium chloride solution. An aqueous solution of the polymer emulsion was prepared and tested as described in Example 16.

The results are shown in Table II.

EXAMPLE 19

The procedures of Example 16 was repeated to prepare to terpolymer having an intrinsic viscosity of 19 dl/g as measured in a one normal aqueous sodium chloride solution. An aqueous solution of the polymer emulsion was prepared and tested as described in Example 16.

The results are shown in Table II.

EXAMPLE 20

The procedure of Example 16 was repeated to prepare a terpolymer having an intrinsic viscosity of 22 dl/g as measured in a one normal aqueous sodium chloride solution. An aqueous solution of the polymer emulsion was prepared and tested as described in Example 16.

The results are shown in Table II.

EXAMPLE 21

The procedure of Example 16 was repeated to prepare a terpolymer having an intrinsic viscosity of 28 dl/g as measured in a one normal aqueous sodium chloride solution. An aqueous solution of the polymer emulsion was prepared and tested as described in Example 16.

The results are shown in Table II.

TABLE II

| Example | I.V. of Polymer (dl/g) | Performance, '70(sec) |
|---|---|---|
| 16 | 13 | 41 |
| 17 | 15 | 30.5 |
| 18 | 17 | 20 |
| 19 | 19 | 13 |
| 20 | 22 | 11.5 |
| 21 | 28 | 11.5 |

What is claimed is:

1. A process for flocculating phosphatic slimes which comprises:
   (a) forming a concentrated aqueous solution from a water-soluble, ter- or higher polymer water-in-oil emulsion, wherein said polymer has the formula containing the repeating units as follows:

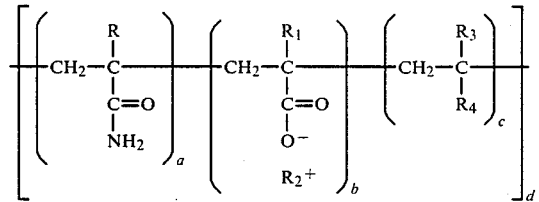

wherein:
   $R$, $R_1$ and $R_3$ are independently hydrogen or methyl;
   $R_2^+$ is an alkali metal ion;
   $R_4$ is $OR_5$ wherein $R_5$ is an alkyl group having up to 5 carbon atoms;

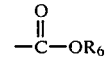

wherein $R_6$ is an alkyl group having up to 8 carbon atoms;

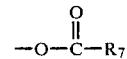

wherein $R_7$ is methyl, ethyl or butyl; phenyl; substituted phenyl; CN or

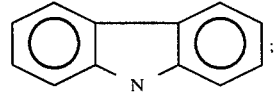

a is from about 30 to about 90 mole percent;
b is from about 5 to about 60 mole percent;
c is from about 1 to about 10 mole percent;
d is an integer of from about 1,000 to about 500,000;

and wherein said polymer has an intrinsic viscosity from about 15 to about 28 dl/g as measured in a one normal aqueous sodium chloride solution;
   (b) diluting said concentrated aqueous solution of ter- or higher polymer formed in step (a) with additional water;
   (c) mixing the diluted solution of step (b) with phosphatic slimes under floc forming conditions; and
   (d) allowing the suspended solids to settle from said slime to form an essentially clear aqueous supernatant.

2. The process of claim 1 wherein:
R, $R_1$ and $R_3$ are hydrogen;
$R_2^+$ is $Na^+$ or $K^+$; and

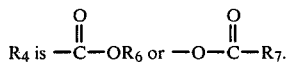

3. The process of claim 2 wherein $R_2^+$ is $Na^+$, $R_6$ is ethyl and $R_7$ is methyl.

4. The process of claim 1 wherein said polymer has the formula containing the repeating units as follows:

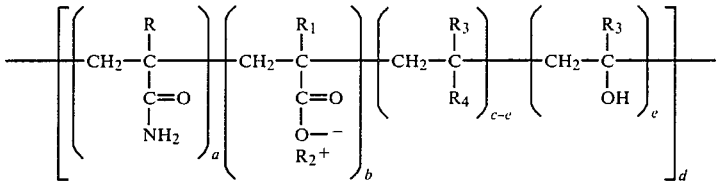

wherein:
R, $R_1$ and $R_3$ are independently hydrogen or methyl;
$R_2^+$ is an alkali metal ion;
$R_4$ is $OR_5$ wherein $R_5$ is an alkyl group having up to 5 carbon atoms; or

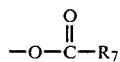

wherein $R_7$ is methyl, ethyl or butyl;
a is from about 30 to about 90 mole percent;
b is from about 5 to about 60 mole percent;
c is from about 1 to about 10 mole percent; and
e is from about 1 to about 10 mole percent.

5. The process of claim 4 wherein:
R, $R_1$ and $R_3$ are hydrogen;
$R_2^+$ is $Na^+$ or $K^+$; and

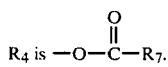

6. The process of claim 5 wherein $R_2^+$ is $Na^+$ and $R_7$ is methyl.

7. The process of claim 1 wherein repeating unit (c) is derived from a monomer that is water insoluble or very slightly water soluble which is selected from the group consisting of vinyl ethers, alkyl acrylates or methacrylates, vinyl esters, styrene, substituted styrene, acrylonitrile and N-vinyl carbazole.

8. The process of claim 7 wherein said monomer is an alkyl acrylate or vinyl ester.

9. The process of claim 8 wherein said monomer is vinyl acetate or ethyl acrylate.

10. A process for flocculating phosphatic slimes which comprises:
   (a) forming a concentrated aqueous solution from a water-soluble, ter- or higher polymer water-in-oil emulsion, wherein said polymer has the formula containing the repeating units as follows:

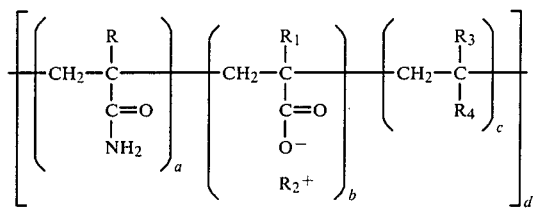

wherein:
R, $R_1$ and $R_3$ are independently hydrogen or methyl;
$R_2^+$ is an alkali metal ion;
$R_4$ is $OR_5$ wherein $R_5$ is an alkyl group having up to 5 carbon atoms;

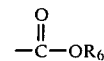

wherein $R_6$ is an alkyl group having up to 8 carbon atoms;

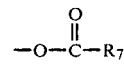

wherein $R_7$ is methyl, ethyl or butyl; phenyl; substituted phenyl; CN or

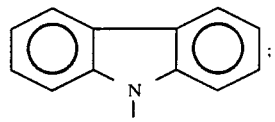

a is from about 55 to about 85 mole percent;
b is from about 10 to about 41.1 mole percent;
c is from about 5 to about 12.5 mole percent;
d is an integer of from about 1,000 to about 500,000;
and wherein said polymer has an intrinsic viscosity of from about 15 to about 28 dl/g as measured in a one normal aqueous sodium chloride solution;
   (b) diluting said concentrated aqueous solution of ter- or higher polymer formed in step (a) with additional water;
   (c) mixing the diluted solution of (b) with phosphatic slimes under floc forming conditions; and
   (d) allowing the suspended solids to settle from said slime to form an essentially clear aqueous supernatant.

* * * * *